United States Patent
Animesh et al.

(10) Patent No.: US 10,067,959 B1
(45) Date of Patent: Sep. 4, 2018

(54) TECHNIQUES FOR ADAPTING DATA STORAGE SYSTEMS FOR PEAKY USAGE MODELS

(71) Applicant: Amazon Technologies, Inc., Seattle, WA (US)

(72) Inventors: Rishabh Animesh, Seattle, WA (US); Sandesh Doddameti, Seattle, WA (US); Ryan Charles Schmitt, Seattle, WA (US); Mark Christopher Seigle, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 743 days.

(21) Appl. No.: 14/578,230

(22) Filed: Dec. 19, 2014

(51) Int. Cl.
*G06F 17/30* (2006.01)

(52) U.S. Cl.
CPC .. *G06F 17/30312* (2013.01); *G06F 17/30424* (2013.01)

(58) Field of Classification Search
CPC ........ G06F 17/30312; G06F 17/30424; G06F 17/30657; G06F 17/30929; G06F 17/30979
See application file for complete search history.

(56) References Cited

U.S. PATENT DOCUMENTS

| | | | | |
|---|---|---|---|---|
| 5,276,848 A * | 1/1994 | Gallagher | ........... | G06F 12/0811 711/121 |
| 6,161,208 A * | 12/2000 | Dutton | ................ | G06F 11/1008 711/118 |
| 6,513,099 B1 * | 1/2003 | Smith | ................. | G06F 12/0875 345/501 |
| 8,370,579 B2 * | 2/2013 | Strumpen | ........... | G06F 12/0811 711/120 |
| 8,566,525 B2 * | 10/2013 | Ash | ..................... | G06F 12/0866 710/28 |
| 9,274,956 B1 * | 3/2016 | Salyers | ............... | G06F 12/0808 |
| 9,384,147 B1 * | 7/2016 | Morshed | ............... | G06F 12/123 |
| 9,559,889 B1 * | 1/2017 | Vincent | ............. | H04L 29/08522 |
| 9,870,211 B2 * | 1/2018 | Risbood | .................... | G06F 8/60 |
| 9,940,244 B2 * | 4/2018 | Quimbey | ............ | G06F 12/0888 |
| 2003/0131198 A1 * | 7/2003 | Wolrich | .............. | G06F 12/0875 711/136 |

(Continued)

OTHER PUBLICATIONS

Mickens et al., Blizzard: Fast, Cloud-scale Block Storage for Cloud-oblivious Applications, Apr. 2-4, 2014, 18 pages.*

*Primary Examiner* — Noosha Arjomandi
(74) *Attorney, Agent, or Firm* — Davis Wright Tremaine LLP

(57) ABSTRACT

Techniques described and suggested herein include implementations of caches and scalers to handle data storage requests, and storage event status requests associated with data storage requests, in a scalable fashion. For example, a data storage system, such as a data storage system implemented by a computing resource service provider in connection with providing an archival storage service or other data storage service, may be implemented to maintain a consistent response time and backend capability for incoming data storage requests, which may be a component of ensuring a consistent customer experience for customers of an associated service, with little or no regard to peaky or high data storage request rates observed by the implementing data storage system.

20 Claims, 8 Drawing Sheets

(56) References Cited

U.S. PATENT DOCUMENTS

| | | | |
|---|---|---|---|
| 2003/0236961 A1* | 12/2003 | Qiu | H04L 67/2852 |
| | | | 711/170 |
| 2006/0242156 A1* | 10/2006 | Bish | H04L 67/1097 |
| 2007/0179995 A1* | 8/2007 | Prahlad | G06F 17/30528 |
| 2010/0122033 A1* | 5/2010 | Gebara | G06F 12/0855 |
| | | | 711/122 |
| 2012/0054367 A1* | 3/2012 | Ramakrishnan | G06F 9/4856 |
| | | | 709/242 |
| 2012/0131257 A1* | 5/2012 | Rudosky | G06F 15/7867 |
| | | | 711/5 |
| 2014/0047181 A1* | 2/2014 | Peterson | G06F 12/0873 |
| | | | 711/118 |
| 2014/0047190 A1* | 2/2014 | Dawkins | G06F 12/0813 |
| | | | 711/136 |
| 2014/0222778 A1* | 8/2014 | Nie | G06F 17/30312 |
| | | | 707/714 |
| 2014/0269484 A1* | 9/2014 | Dankberg | H04L 12/18 |
| | | | 370/312 |
| 2014/0310462 A1* | 10/2014 | Waldspurger | G06F 12/0891 |
| | | | 711/118 |
| 2015/0268866 A1* | 9/2015 | Nakagawa | G06F 3/0608 |
| | | | 711/114 |
| 2016/0286289 A1* | 9/2016 | Long | H04Q 11/0062 |

\* cited by examiner

TECHNIQUES FOR ADAPTING DATA STORAGE SYSTEMS FOR PEAKY USAGE MODELS

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as need and depending on their needs.

The proliferation of network computing and storage, as well as the attendant increase in the number of entities dependent on network computing and storage, has increased the importance of optimizing data performance and consistent user experience for network computing and storage systems. Data archival systems and services, for example, may use asynchronous processes to handle large volumes of data storage, but for some data storage tasks, there may be a considerable lag between when a given data storage request is received and when the request is fully processed.

BRIEF DESCRIPTION OF THE DRAWINGS

Various embodiments in accordance with the present disclosure will be described with reference to the drawings, in which.

DETAILED DESCRIPTION

Figure 1:
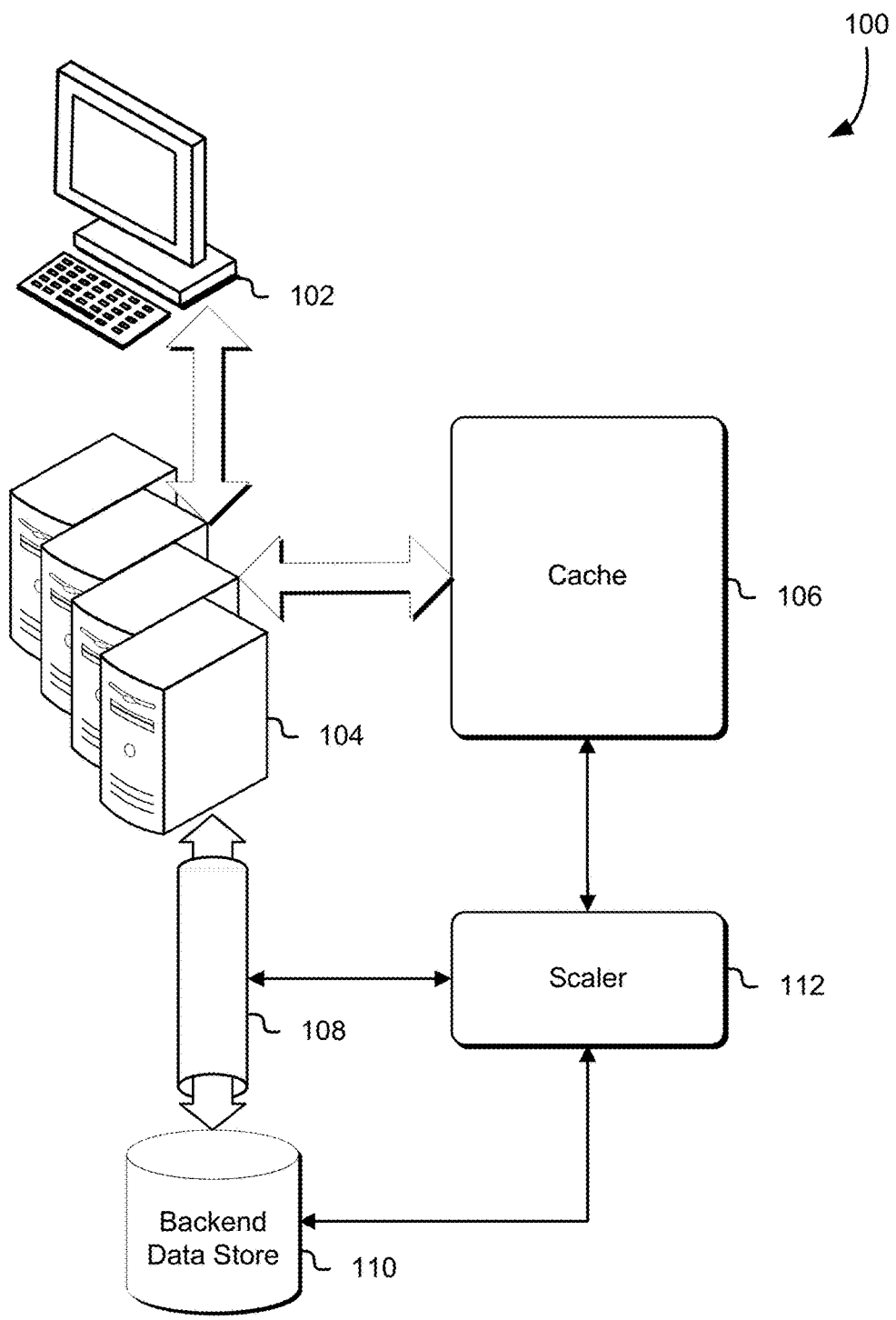
FIG. 1 schematically illustrates an environment implementing a cache and a scaler to manage data storage requests on a data storage system, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include implementations of caches and scalers to handle data storage requests, and storage event status requests associated with data storage requests, in a scalable fashion. For example, a data storage system, such as a data storage system implemented by a computing resource service provider in connection with providing an archival storage service or other data storage service, may be implemented such that the data storage system synchronously responds to storage event status requests, in a fashion independent of asynchronicity of one or more processes used to service an associated data storage request. Such implementations may be used to maintain a consistent response time for storage event status requests, which may be a component of ensuring a consistent customer experience for customers of an associated service, with little or no regard to peaky or high data storage request rates observed by the implementing data storage system.

In some embodiments, a cache may be implemented so as to store, on a temporary basis, event records related to data storage requests that have been queued, but not yet processed for permanent storage of associated data (e.g., by a backend data store of the data storage system). For example, the data storage requests may first be queued by one or more resources of an implementing data storage system, and after queuing, event records related to the data storage requests may be placed in a cache so as to be made available if status regarding the data storage requests is requested prior to the data storage requests having been dequeued and fully processed. As may be contemplated, in embodiments where the data storage requests are placed in the queue as part of process that is synchronous relative to the time at which the data storage requests are received by the data storage system, if storing associated event records in the cache is also part of that synchronous process, a requestor may request event records relatively sooner than if an asynchronous process, such as processing data storage jobs associated with the data storage requests, generated such event records.

As another example, the data storage system may implement a scaler to adjust various functional aspects of the data storage system in accordance with the rate of incoming data storage requests, such as may be determined or detected by the scaler. For example, the length of the queue may be increased or decreased based on the relative rate of data storage requests received by the implementing data storage system, in some cases up to a length corresponding with the size of the implemented cache. In some embodiments, the capacity of a backend data store may be adjusted, as well as the rate at which data storage requests are dequeued from the queue into the backend data store, in accordance with the determined or observed request rate. As may be contemplated, such techniques may be implement alone or in combination with the various caching techniques described herein to handle, for example, unpredictable and/or variable rates of data requests, yet maintain a consistent experience for clients interacting with the implementing data storage system.

FIG. 1 schematically illustrates an environment implementing a cache and a scaler to manage data storage requests on a data storage system, in accordance with some embodiments. One or more client entities 102, such as those under control of a customer of a computing resource service provider, submit data storage requests to a data storage system 104 for processing and eventual storage on a backend data store 110. The client entities 102 may be any entity capable of transacting data with a data storage system, such as over a network (including the Internet). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 106 via application programming interface calls, web service calls, or other programmatic methods), and the like.

The data storage system 104 may be any computing resource or collection of such resources capable of processing data for storage, and interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 104 via application programming interface calls, web service calls, or other programmatic methods), and the like. In some embodiments, the resources of the data storage system 104, as well as the data storage system 104 itself, may be one or more resources of a computing resource service provider, such as that described in further detail below. In some embodiments, the data storage system 104 and/or the computing resource service provider provides one or more archival storage services and/or data storage services, such as those described in further below, through which the client entities 104 may transact data such as data in connection with data storage requests received from the client entities 102.

The data storage system 104 is connected to or includes one or more backend data stores 110 on which data associated with the data storage requests, and in some embodiments, status information related to such data storage requests, are stored. The backend data store 110 may be any data store, whether logical or physical, capable of storing or addressing data stored therein. In some embodiments, the backend data store 110 may map on a one-to-one basis with the data storage devices on which they reside (and, in some embodiments, may actually be the data storage devices themselves). In some embodiments, the size and/or quantity of the backend data store 108 may be independent of the capacity of the data storage devices on which they reside (e.g., a set of backend data stores may each be of a fixed size such that a second set of backend data stores may reside on the same data storage devices as the first set). The data storage devices may include any resource or collection of resources, such as those of a computing resource service provider, that are capable of storing data, and may be physical, virtual, or some combination of the two. For example, in some embodiments, the backend data store may include a collection of provisionable hosts or other computing devices, any number or combination of which may be selected for data storage on an ad hoc basis, such as to scale up and down in connection with a request rate as determined or observed by a scaler 112.

In some embodiments, data storage requests may be placed in a queue 108 that is connected to and/or integrated in either or both the data storage system 104 and/or the backend data store 110. The queue 108 may be any computing resource or collection of computing resources, such as that of an implementing computing resource service provider, that is capable of temporarily storing data, such as data associated with incoming data storage requests as received by the data storage system 104, and providing the stored data to a different computing entity (such as a backend data store 110) in a specified order. For example, the queue 108 may be one or more buffers allocated in the memory of the data storage system 104 or other resource(s) of an implementing computing resource service provider. As another example, the specified order may be provided by, e.g., the backend data store 110 or the scaler 112, in connection with an optimal order for processing by the backend data store 110. As yet another example, the specified order may be a first-in, first-out order, in which the queue 108 acts as a buffer to smooth out peaks in request rate. The queue 108 may be implemented so as to make any data placed therein highly available, e.g., resistant to malfunction or outage of a subset of the resources of the queue 108. In some embodiments, the queue 108 may be a distributed queue 108, e.g., implemented across a plurality of redundant and/or replicated resources.

The data storage system 104 may be connected to (or implemented to include) a cache 106 and/or a scaler 112. The cache 106 may be any resource or collection of computing resources, such as that of a computing resource service provider, that is capable of temporarily storing data and providing access to stored data via keys and/or indexed associated with specified quanta of the stored data, such as event records as described in further detail herein. For example, the cache 106 may be a database implemented in the memory, or the portion of the memory, of a virtual computing system provided in connection with a computing resource service provider. As another example, the cache 106 may be a key-value store implemented in the memory, or the portion of the memory, of the data storage system 104. As yet another example, the cache 106 may be provided in connection with a service of an implementing computing resource service provider. The cache 106 may be implemented so as to make any data placed therein highly available, e.g., resistant to malfunction or outage of a subset of the resources of the queue 106. In some embodiments, the cache 106 may be a distributed cache 106, e.g., implemented across a plurality of redundant and/or replicated resources.

The scaler 112 may be any resource or collection of computing resources, such as that of a computing resource service provider, that is capable of determining and/or observing a request rate for data storage requests received by the data storage system 104. The scaler 112 may also be capable of forecasting future request rates based on previously observed and/or determined request rates. The scaler 112 may also be capable of causing operational changes (e.g., provisioning and/or scaling, up and/or down, of capabilities) to the various components described herein, such as the computational and/or data storage capacity of the backend data store 110, the length of the queue 108, the dequeuing rate from the queue 108 into the backend data store 110, and the like.

As discussed in greater detail herein, the data storage system 104 may utilize the cache 106 to synchronously respond to storage event status requests, in a fashion independent of asynchronicity of one or more processes used by the backend data store 110 to service associated data storage requests. Such implementations may be used to maintain a consistent response time for incoming storage event status requests, which may be a component of ensuring a consistent customer experience for customers of an associated service, with little or no regard to peaky or high data storage request rates (e.g., of the client entities 102), observed by the implementing data storage system 104.

In some embodiments, the cache 106 may be implemented so as to store, on a temporary basis, event records related to data storage requests that have been queued, but not yet processed for permanent storage of associated data by the backend data store 110. For example, the data storage requests may first be placed in the queue 108, and after queuing, event records related to the queued data storage requests may be synchronously placed in the cache 106 so as to be made available if status regarding the data storage requests is requested, e.g., by the client entities 102, prior to the data storage requests having been dequeued into the backend data store 110. In embodiments where the data storage requests are placed in the queue 108 as part of a process that is synchronous relative to the time at which the data storage requests are received by the data storage system 104, storing associated event records in the cache 108 as part of that synchronous process, may enable a client entity 102 to request and receive event records associated with the data storage requests relatively sooner than if an asynchronous process, such as data storage job processing by the backend data store 110, generated such event records or data storage request-related information.

In some embodiments, the data storage system 104 may interact with a scaler 112 to adjust various functional aspects of the data storage system 104 in accordance with the rate of incoming data storage requests, such as may be determined or detected by the scaler 112. For example, the length of the queue 108 may be increased or decreased based on the relative rate of data storage requests received by the implementing data storage system 104, in some cases up to a length corresponding with the size of the implemented cache 106. In some embodiments, the capacity of a backend data store 110 may be adjusted, as well as the rate at which data storage requests are dequeued from the queue 108 into the backend data store 110, in accordance with the determined or observed request rate. As may be contemplated, such techniques may be implement alone or in combination with the various caching techniques described herein to handle, for example, unpredictable and/or variable rates of data requests, yet maintain a consistent experience for client entities 102 interacting with the implementing data storage system 104.

Figure 2:
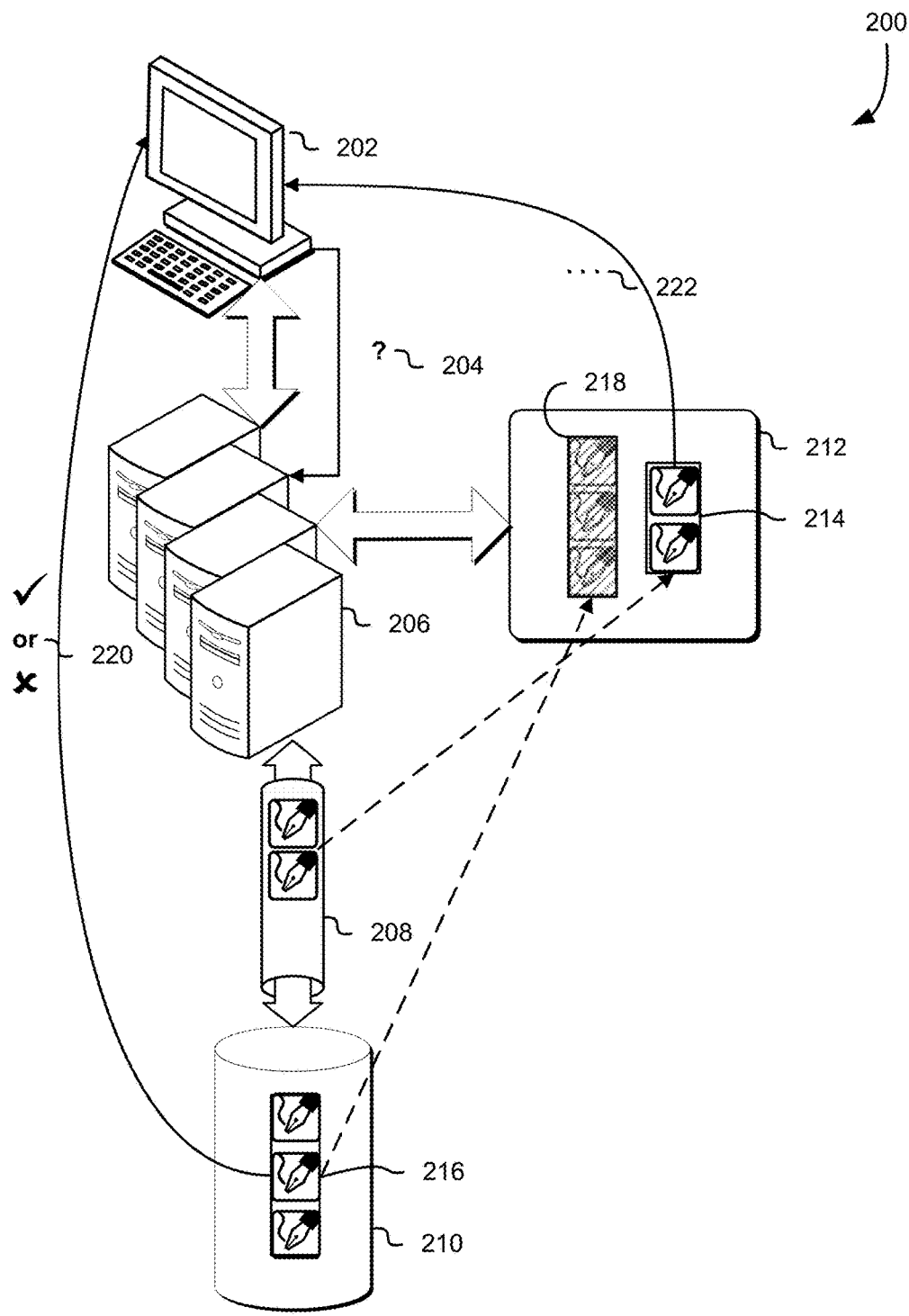
FIG. 2 schematically illustrates various workflows for processing data storage requests and storage event status requests using a cache, in accordance with some embodiments.

FIG. 2 schematically illustrates various workflows for processing data storage requests and storage event status requests using a cache, in accordance with some embodiments. A client entity 202, which in some embodiments may be similar to the client entities discussed in connection with at least FIG. 1 above, submits storage event status requests 204 to a data storage system 206, such as over a network. The data storage system 206 may be similar to the data storage system described in connection with at least FIG. 1 above. The storage event status requests 204 may be requests in any form and may be communicated in any appropriate fashion. For example, the client entity 202 may submit such storage event status requests 204 in a programmatic fashion, such as through an application programming interface (API) call or a web service call, through a user interface, or in some other fashion. The storage event status requests 204 may relate to one or data storage requests submitted by the same or different client entity 202, and the data storage system 206 (or other component and/or service of an implementing computing resource service provider) may verify that the client entity 202 has the appropriate credentials to submit storage event status requests, e.g., for a given set of data storage requests, prior to taking action in response.

As previously discussed, the data storage system 206 may be in communication with a queue 208 and a backend data store 210, and may process incoming data storage requests so as to place data storage requests in the queue 208 for eventual further processing (e.g., final storage) of the data associated with such data storage requests on the backend data store 210. The queue 208 and the backend data store 210 may be similar to the queue and the backend data store discussed in connection with at least FIG. 1 above. Also as previously mentioned, in some embodiments, information associated with the incoming data storage requests may be placed in the queue 208 in a synchronous fashion relative to the data storage requests themselves, and in some of such embodiments, event records associated with the data storage requests may be placed in an associated cache 212 (which may, in some embodiments, be similar to the cache discussed in connection with FIG. 1 above).

In some embodiments, the data storage requests in queue 208 may be dequeued, in an asynchronous fashion relative to the data storage requests as received from the client entity, into the backend data store 210 for processing. Such processing may include storing data associated with the data storage requests on one or more resources of the backend data store, as well as generating status information, such as progress information, success and/or failure of a given operation related to the data storage requests, incident to the storage of the associated data.

As previously mentioned, the cache 212 may be implemented so as to store, on a temporary basis, event records 214 related to data storage requests that have been queued (as illustrated in connection with the queue 208), but not yet processed for permanent storage of associated data by the backend data store 210. The event records 214 may include data, such as metadata, regarding various attributes of the associated data storage records, and may be retrievable and/or locatable based on a key or other identifier implemented by the cache 212. Such keys or other identifiers may, in some embodiments, be associated with the appropriate data storage requests, so as to enable, e.g., the data storage system 206 and/or implementing computing resource service provider, to more efficiently map a given data storage request to the attendant event record(s). The attributes reflected by the event records 214 may include a description of the associated data, the size of the data associated with the data storage request, an initial timestamp (e.g., the time a given data storage request was received by the data storage system 206), a queueing timestamp (e.g., the time at which the data storage requests were queued), the identifier assigned to the data storage request, information regarding the data to be stored in connection with the data storage request, such as size, expected time to complete, and a pointer to the location at which the data is being held while awaiting processing by the backend data store 210, and the like.

At a time after the data storage system 206 or other resource of the computing resource service provider dequeues the data storage request into the backend data store 210, the associated event records 218 may be removed from the cache 212. In such embodiments, status information regarding the processing of the data storage request post-dequeuing may be generated and stored on one or more resources of the backend data store, and in some of such embodiments, may be similar in format or contained information to that of the event records. As may be contemplated, in such embodiments, the effect of removing the event records from the cache 212 after dequeuing and storing and/or regenerating status information on the backend data store 210 effectively shifts the location of information regarding the status of a given data storage request from the cache 212 to the backend data store 210 upon dequeuing. Furthermore, it may be appreciated that, in embodiments where the data storage request, the enqueuing of the data storage request, and the creation of an event record in the cache 212 are performed synchronously relative to each other, the appearance of an event record in the cache 212 may imply that the associated data storage request resides in the queue 208. Additionally, the presence of status information on the backend data store 210 may imply that the data storage request was successfully dequeued, or in any event, no longer in the queue 208 awaiting processing.

Such implications may be utilized by the data storage system 206, in connection with the cache 212, to efficiently respond to storage event status requests, regardless of the dependence and/or timing of the processes used by the backend data store 210 to service the associated data storage requests. For example, in response to a storage event status request 204 from, e.g., client entity 202, the data storage system 206 or other resource(s) of an implementing computing resource service provider may first attempt to locate status information 220 on the backend data store 210, so as to provide relevant information regarding the processing of the subject data storage request to the requestor. In the case that the data storage request 208 was dequeued but the request was unsuccessfully processed by the backend data store, in some embodiments, the relevant information may indicate that processing was attempted but unsuccessful. If the request was successfully processed by the backend data store, however, the relevant information may indicate that processing was successful.

If no such status information is found on the backend data store 210, the data storage system 206 or other resource(s) may query the cache to locate the associated event record. If an associated event record is found (e.g., 214), as previously discussed, it may be implied that the associated data storage request exists in the queue 208 and is still pending 222, i.e., received by the data storage system 206, but not yet dequeued. Such queries, e.g., to the backend data store 210 and/or the cache 212, may occur in any appropriate order for the implementation. In some embodiments, a timer may be implemented in connection with the queue 214, such that if a given event record has stayed in the queue 214 for longer than a predetermined length of time without having been dequeued (e.g., received by the backend data store 210), a component of the data storage system 260 or other resource (s) may attempt to, e.g., requeue the associated data storage request in the queue 208 for further processing.

Figure 3:
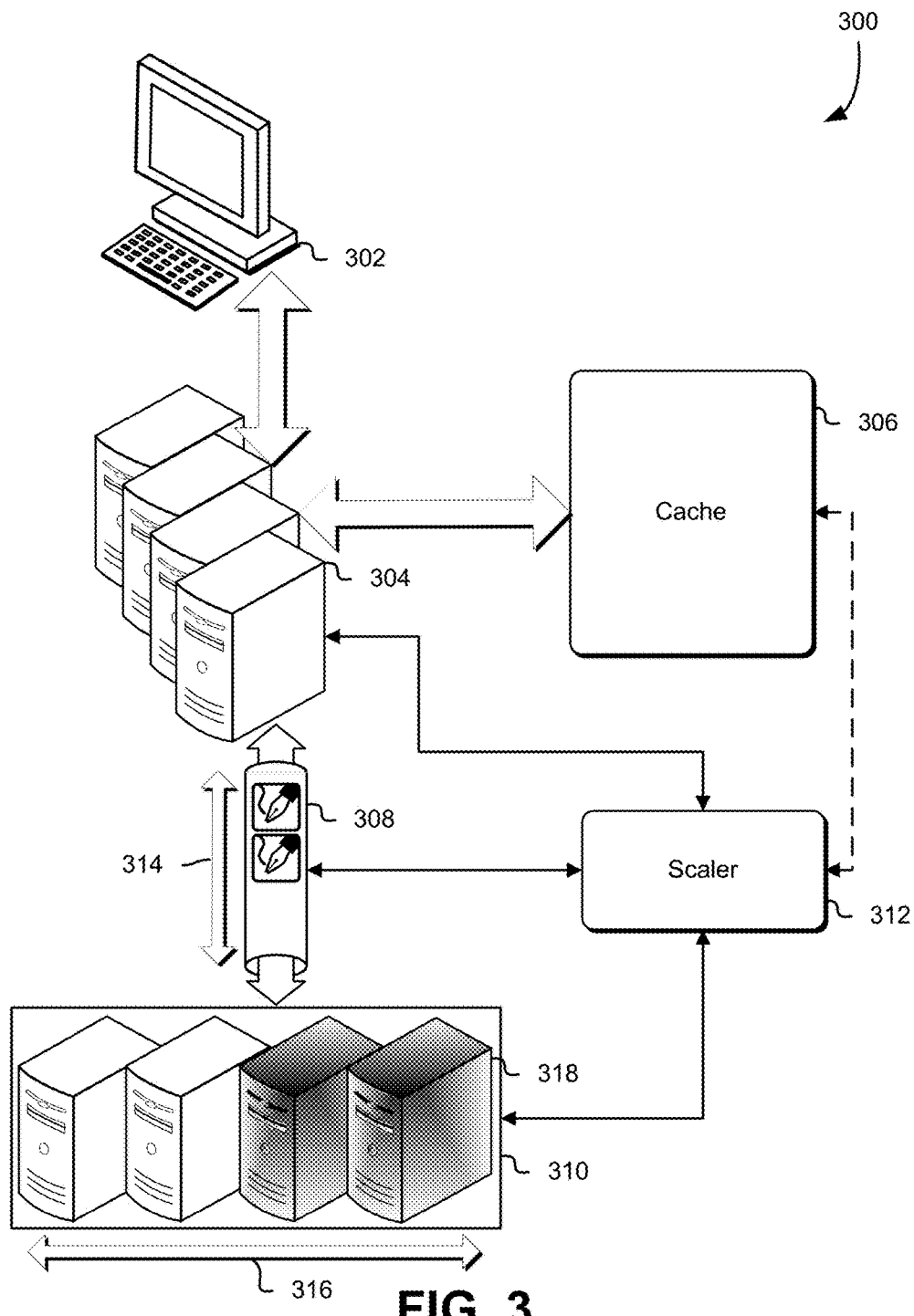
FIG. 3 schematically illustrates various workflows for scaling capabilities of a data storage system using a scaler, in accordance with some embodiments.

FIG. 3 schematically illustrates various workflows for scaling capabilities of a data storage system using a scaler, in accordance with some embodiments. One or more client entities 302 interact with a data storage system 304 to, e.g., submit data storage requests that may be cached in cache 306 and queued in queue 308 for processing by a backend datastore 310, according to techniques described in further detail herein, such as in connection with FIGS. 1 and 2 above. The client entity/ies 302, the data storage system 304, the cache 306, the queue 308, and the data storage system 310 may be similar to various components described in connection with at least FIGS. 1 and 2 above.

In some embodiments, the data storage system 304 may interact with a scaler 312 to adjust various functional aspects and/or components of or associated with the data storage system 304 in accordance with the rate of data storage requests inbound to the data storage system 304 from the client entity/ies 302, such as may be determined or detected by the scaler 312. The request rate may be instantaneous, over a predetermined length of time, or predictive. In embodiments where the determined request rate is predictive, the scaler 312 may calculate an expected request rate in anticipation of a future change in the request rate based on, e.g., request rate history or other past and/or present behavior detected and/or determined by the scaler 312 in connection with the operation of the data storage system 304. The scaler 312 itself may be similar to the scaler discussed in connection with at least FIG. 1 above.

As mentioned, the scaler 312 may be capable of adjusting, either directly, indirectly, or some combination thereof, various functional aspects and/or components in response to a determined and/or detected request rate or other attributes (such as expected latency and/or bandwidth of the implementing data storage system 304, the nature of the incoming data storage requests, and the like). For example, the length of the queue 308 may be increased or decreased 314 based on the request rate of data storage requests received by the implementing data storage system 304. In some embodiments, the scaler 312 may detect that the incoming request rate will cause the presently allocated queue length to fill or overflow based on the current dequeuing rate and/or current backend data store capabilities, and may increase the queue length to accommodate, e.g., spikes in the incoming request rate. As an example, if a spike in the request rate is short and lengthening the queue 308 may allow the data storage system 304 and/or backend data store 310 to stay ahead of the building queue without necessitating changes to the dequeuing rate and/or the backend data store 310 capabilities, the scaler 312 may lengthen the queue 308 and perform no further adjustments. In some embodiments, the size of the cache 306 is bounded, and in some of such embodiments where event records are written for each data storage request written to the queue, the scaler 312 may increase the queue length to a maximum size corresponding to (e.g., bounded by) the bounded size of the associated cache 306.

In some embodiments, the scaler 312 may adjust the dequeuing rate from the queue 308 into the backend data store 310, in connection with or independently of other adjustments initiated by the scaler 312. For example, the scaler 312 may increase the dequeuing rate if the available backend data store capabilities are greater than the current dequeuing rate requires. As another example, if the available backend data store capabilities are low relative to the present dequeuing rate (thus causing an overload on the backend data store), the dequeuing rate may be decreased. It is contemplated that the scaler 312 may adjust the dequeuing rate for reasons, and to different ends, than the examples listed herein.

In some embodiments, the scaler 312 may adjust the capacity of the backend data store 310 may be adjusted 316, in accordance with the determined or observed request rate or other attributes. As an example, the backend data store may include a plurality of provisionable hosts 318, a subset of which is selected for ordinary operation of the backend data store (e.g., during times of low or normal request rates). If an increase in the request rate is determined or detected by the scaler 312, the scaler 312 may cause the backend data store to spin up additional computational and/or storage capacity associated with the backend data store 310, such as by causing the backend data store 310 to provision additional hosts to meet the demand.

After the request rate lowers, the scaler 312 may deprovision some of the hosts so as to free up associated resources, e.g., for other uses to which such hosts may be applied. As may be contemplated, the nominal subset of provisionable hosts (e.g., fraction of overall computational and/or storage capacity of the backend data store 310) may be selected, such as by the data storage system 304 or the scaler 312, to meet the normal demand (such as may be observed and/or determined by the scaler 312 over a period of time), but not necessarily sufficient to meet heightened demand. In such embodiments, the implementation of the scaler 312 may allow for efficient use of resources of the backend data store yet retain responsiveness and/or capability at times of heightened request rate (e.g., demand). As may be contemplated, the scaling techniques described herein may be implemented independently, or in combination with, the various caching techniques described in connection with at least FIGS. 1 and 2 above to even more effectively account for unpredictable and/or variable rates of data requests while maintaining a consistent experience for client entities 302 interacting with the implementing data storage system 304.

Figure 4:
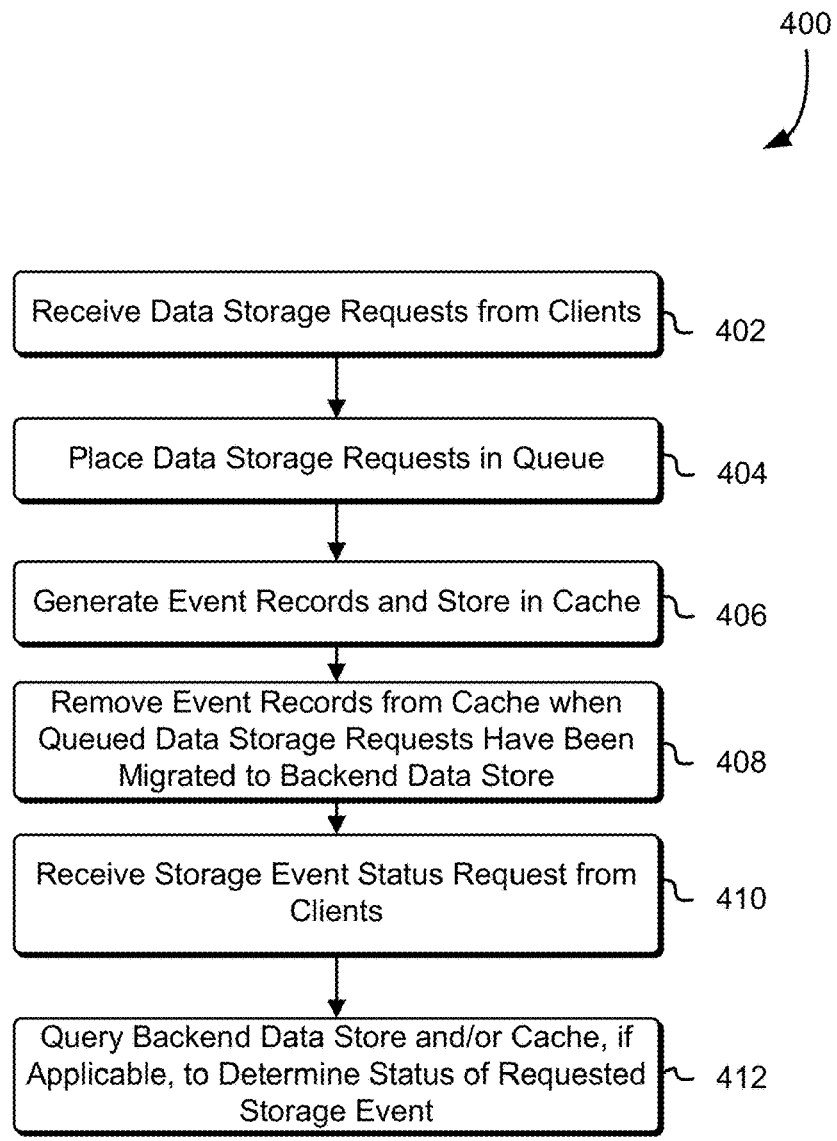
FIG. 4 schematically illustrates an example process for processing data storage requests and storage event status requests, in accordance with some embodiments.

FIG. 4 schematically illustrates an example process for processing data storage requests and storage event status requests, in accordance with some embodiments. At step 402, data storage requests are received, such as by a data storage system and/or a service in connection with the data storage system as described in connection with at least FIGS. 1 and 2, from client entities, such as client entities described in connection with at least FIGS. 1 through 3. As previously discussed, such data storage requests may be received in any appropriate fashion, such as via an application programming interface call, web service call, user interface, and the like.

At step 404, the data storage requests received in connection with step 402 are placed in a queue, which may be similar to the queue described above in connection with at least FIGS. 1 through 3. In some embodiments, the data storage requests themselves may reside in the queue while the associated data to be stored in connection with the data storage requests resides elsewhere. In some embodiments, the data connected with the data storage requests may also be placed in the queue along with the data storage requests.

At step 406, event records, such as the event records described above in connection with at least FIGS. 1 and 2, are generated, such as by the data storage system or a resource associated with an implementing computing resource service provider, and stored in a cache. The cache may be similar to the cache described above in connection with FIGS. 1 through 3, and may, for example, be implemented using a key-value store or other structure that provides retrievable identifiers for each entry (e.g., in this example, each event record). As previously discussed, the event record generation of step 406 may performed synchronously with the queuing of the data storage requests at step 404, relative to the receipt of the data storage requests in step 402.

At step 408, at a time after the data storage requests queued in step 404 are removed from the queue, e.g., by virtue of having been dequeued into a backend data store such as the backend data store described above in connection with at least FIGS. 1 through 3, the associated event records (as generated in step 406) are removed from the cache. The removal may be initiated by, e.g., the data storage system, any resources implementing the queue, or some resource of the computing resource service provider that is external to the queue. For example, the removal may be initiated after the successful dequeuing (and migration of responsibility for the data storage request) by the backend data store, and in some embodiments, the backend data store may provide a notification to this effect.

At step 410, storage event status requests are received, such as by a service of the computing resource service provider in connection with the data storage system, from, e.g., client entities, with regard to the status of data storage requests that may have previously been submitted by such client entities (e.g., as described in connection with step 402). As previously discussed, storage even status requests may be received through an appropriate interface, such as an application programming interface call, web service call, user interface, and the like.

At step 412, in response to the storage event status requests, the data storage system (or other appropriate entity) queries the backend data store for status information regarding associated data storage requests. If no status information exists, or if the status information indicates that the data storage requests have not been received and/or processed by the backend data store, the data storage system may also query the cache for the event record and, e.g., return related information to the requestor. As previously discussed, in some embodiments, if an event record exists in the cache, due to it having been written synchronously with the enqueuing of the associated data storage request, it may be imputed that the data storage request was successfully placed in the queue. Analogously, if no event record exists in the queue, it may be imputed that the associated data storage request was either not successfully placed in the queue or has been dequeued, such as to the backend data store (which may have status information that indicates further information regarding the processing status of the data storage request). Such information may be returned to the requestor of a given storage event status request.

Figure 5:
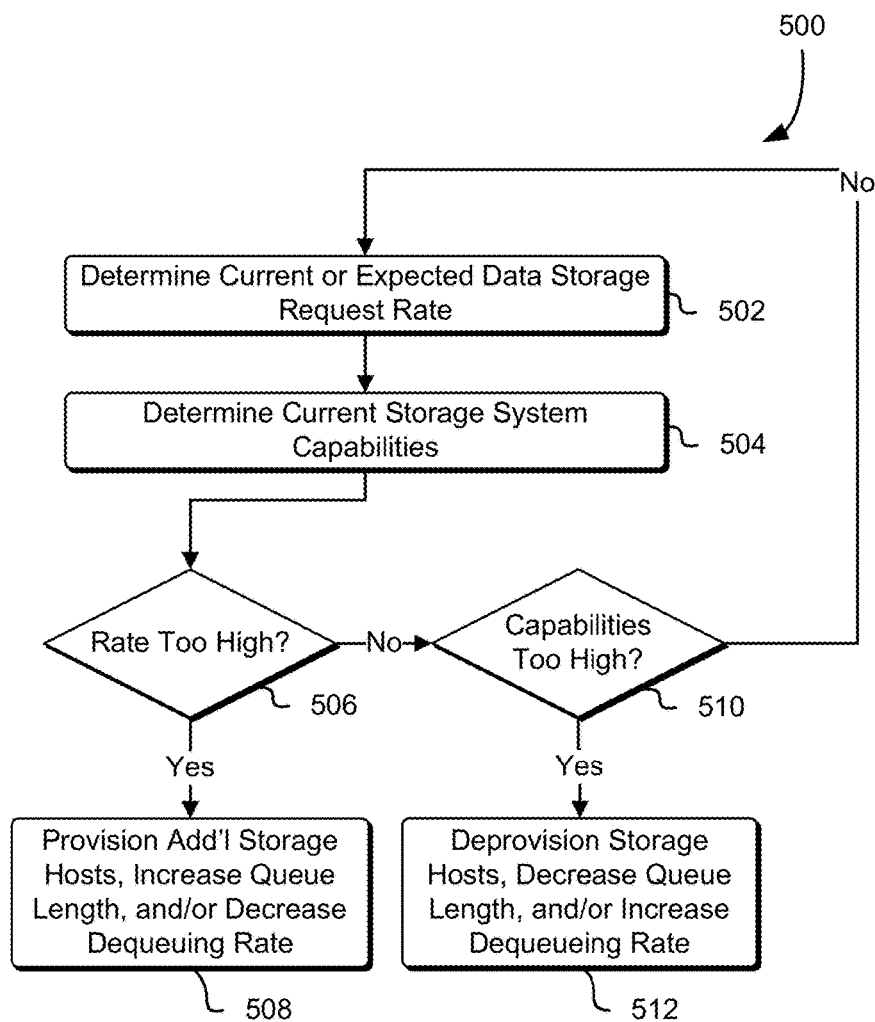
FIG. 5 schematically illustrates an example process for scaling capabilities of a data storage system according to request rate, in accordance with some embodiments.

FIG. 5 schematically illustrates an example process 500 for scaling capabilities of a data storage system according to request rate, in accordance with some embodiments. At step 502, an entity, such as a scaler described above in connection with at least FIGS. 1 through 3, determines and/or observes a current and/or expected request rate for data storage requests inbound into the implementing system, such as a data storage system as described in further detail in connection with at least FIGS. 1 through 4 above. As previously discussed, the determined request rate may be observed for a given period of time, instantaneous, or projected (e.g., based on past observations by, e.g., the scaler).

At step 504, the current capabilities of the data storage system are determined, such as by the scaler, relative to the request rate determined in connection with step 502. Capabilities may include (but are not limited to) the computational and/or storage capacity of the backend data store with which the data storage system is affiliated (and to which data storage requests are terminated), the length of an implemented queue for the data storage records (such as the queue described above in connection with at least FIGS. 1 through 4), the size of a cache for incoming data storage records (such as the cache described above in connection with at least FIGS. 1 through 4), and the rate at which the data storage requests are being dequeued into the backend data store.

At decision point 506, if the scaler determines that the request rate is too high relative to the capabilities determined in connection with step 504, the various capabilities are adjusted at step 508 so as to meet the demand, shorten response latency, and the like. For example, a queue may be initially lengthened (e.g., by the scaler) to accommodate a request rate spike, and then additional hosts may be provisioned (e.g., by the scaler) to, e.g., accommodate additional computational and/or storage demands incurred by the heightened request rate. The dequeuing rate may also be adjusted downward so as to allow time for provisioning additional hosts in the backend data store.

At decision point 510, if the scaler determines that the capabilities of the data storage system are excessive relative to the determined request rate, the various capabilities are adjusted at step 512 so as to free up resources for other operations of, e.g., the data storage system and/or the implementing computing resource service provider. For example, if a request rate spike has passed and it is determined to have returned to normal, hosts in the backend data store may be deprovisioned, the queue length may be shortened, or the dequeuing rate may be increased (e.g., so as to improve service time and shorten latency of fully servicing the data storage requests). In both steps 508 and 512, however, any of the capabilities may independently be increased up or down in any appropriate fashion to respond to a request rate to capability mismatch. If it is determined at decision point 510 that the current capabilities are substantially appropriate for the determined request rate, the request rate may continue to be monitored, and the process 500 may be repeated, such as at an interval.

Figure 6:
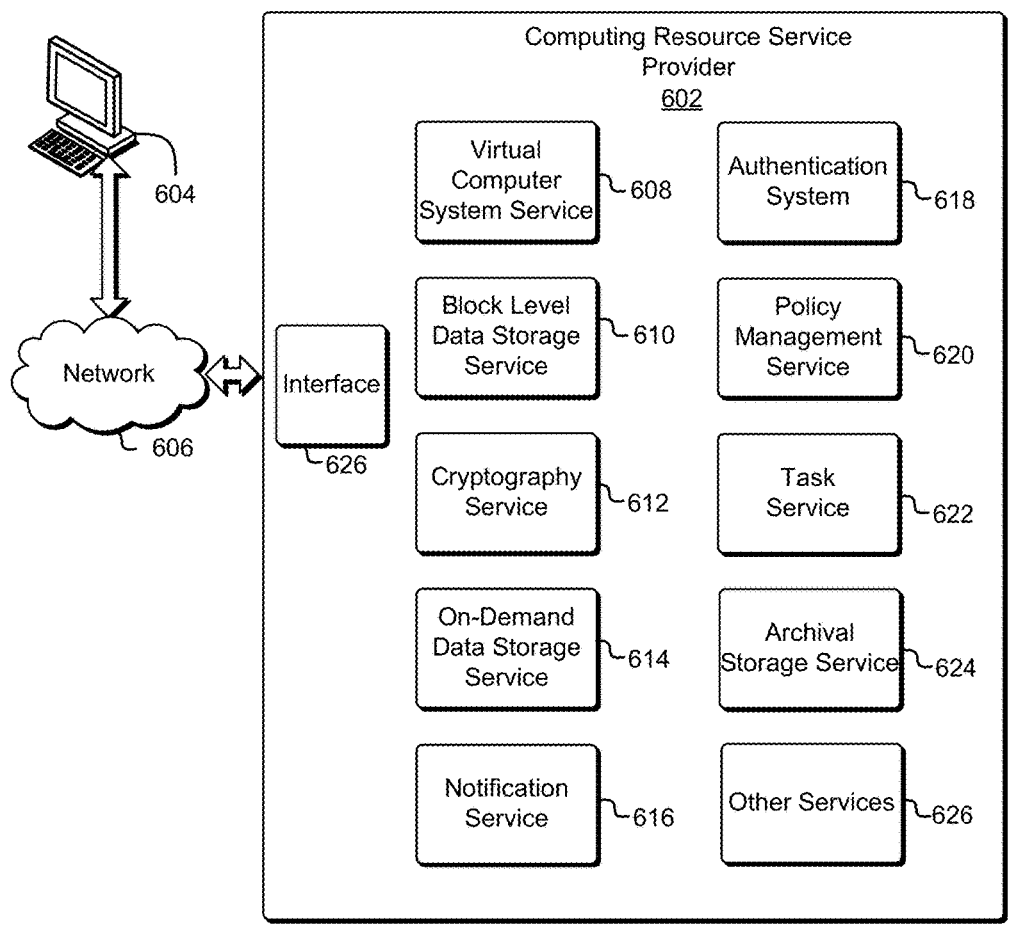
FIG. 6 schematically illustrates an environment, including a computing resource service provider, in which data storage techniques may be implemented, in accordance with some embodiments.

FIG. 6 shows an example of a customer connected to a computing resource service provider in accordance with at least one embodiment. The computing resource service provider 602 may provide a variety of services to the customer 604 and the customer 604 may communicate with the computing resource service provider 602 via an interface 626, which may be a web services interface or any other type of customer interface. While FIG. 6 shows one interface 626 for the services of the computing resource service provider 602, each service may have its own interface and, generally, subsets of the services may have corresponding interfaces in addition to or as an alternative to the interface 626. The customer 604 may be an organization that may utilize one or more of the services provided by the computing resource service provider 602 to maintain and deliver information to its employees, which may be located in various geographical locations. Additionally, the customer 604 may be an individual that utilizes the services of the computing resource service provider 602 to deliver content to a working group located remotely. As shown in FIG. 6, the customer 604 may communicate with the computing resource service provider 602 through a network 606, whereby the network 606 may be a communication network, such as the Internet, an intranet or an Internet service provider (ISP) network. Some communications from the customer 604 to the computing resource service provider 602 may cause the computing resource service provider 602 to operate in accordance with one or more embodiments described or a variation thereof.

The computing resource service provider 602 may provide various computing resource services to its customers. The services provided by the computing resource service provider 602, in this example, include a virtual computer system service 608, a block-level data storage service 610, a cryptography service 612, an on-demand data storage service 614, a notification service 616, an authentication system 618, a policy management service 620, a task service 622 and one or more other services 624. It is noted that not all embodiments described include the services 608-624 described with reference to FIG. 6 and additional services may be provided in addition to or as an alternative to services explicitly described. As described, each of the services 608-624 may include one or more web service interfaces that enable the customer 604 to submit appropriately configured API calls to the various services through web service requests. In addition, each of the services may include one or more service interfaces that enable the services to access each other (e.g., to enable a virtual computer system of the virtual computer system service 608 to store data in or retrieve data from the on-demand data storage service 614 and/or to access one or more block-level data storage devices provided by the block level data storage service 610).

The virtual computer system service 608 may be a collection of computing resources configured to instantiate virtual machine instances on behalf of the customer 604. The customer 604 may interact with the virtual computer system service 608 (via appropriately configured and authenticated API calls) to provision and operate virtual computer systems that are instantiated on physical computing devices hosted and operated by the computing resource service provider 602. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 608 is shown in FIG. 6, any other computer system or computer system service may be utilized in the computing resource service provider 602, such as a computer system or computer system service that does not employ virtualization or instantiation and instead provisions computing resources on dedicated or shared computers/servers and/or other physical devices.

The block-level data storage service 610 may comprise one or more computing resources that collectively operate to store data for a customer 604 using block-level storage devices (and/or virtualizations thereof). The block-level storage devices of the block-level data storage service 610 may, for instance, be operationally attached to virtual computer systems provided by the virtual computer system service 608 to serve as logical units (e.g., virtual drives) for the computer systems. A block-level storage device may enable the persistent storage of data used/generated by a corresponding virtual computer system where the virtual computer system service 608 may only provide ephemeral data storage.

The computing resource service provider 602 also includes a cryptography service 612. The cryptography service 612 may utilize one or more storage services of the computing resource service provider 602 to store keys of the customers in encrypted form, whereby the keys may be usable to decrypt customer 612 keys accessible only to particular devices of the cryptography service 612.

The computing resource service provider 602 further includes an on-demand data storage service 614. The on-demand data storage service 614 may be a collection of computing resources configured to synchronously process requests to store and/or access data. The on-demand data storage service 614 may operate using computing resources (e.g., databases) that enable the on-demand data storage service 614 to locate and retrieve data quickly, to allow data to be provided in responses to requests for the data. For example, the on-demand data storage service 614 may maintain stored data in a manner such that, when a request for a data object is retrieved, the data object can be provided (or streaming of the data object can be initiated) in a response to the request. As noted, data stored in the on-demand data storage service 614 may be organized into data objects. The data objects may have arbitrary sizes except, perhaps, for certain constraints on size. Thus, the on-demand data storage service 614 may store numerous data objects of varying sizes. The on-demand data storage service 614 may operate as a key value store that associates data objects with identifiers of the data objects that may be used by the customer 604 to retrieve or perform other operations in connection with the data objects stored by the on-demand data storage service 614.

In the environment illustrated in FIG. 6, a notification service 616 is included. The notification service 616 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 616 may provide notifications to clients using a "push" mechanism without the need to check periodically or "poll" for new information and updates. The notification service 616 may further be used for various purposes such as monitoring applications executing in the virtual computer system service 608, workflow systems, time-sensitive information updates, mobile applications, and many others.

As illustrated in FIG. 6, the computing resource service provider 602, in various embodiments, includes an authentication system 618 and a policy management service 620. The authentication system 618, in an embodiment, is a computer system (i.e., collection of computing resources) configured to perform operations involved in authentication of users of the customer. For instance, one of the services 608-616 and 620-624 may provide information from a user to the authentication system 618 to receive information in return that indicates whether the user requests are authentic.

The policy management service 620, in an embodiment, is a computer system configured to manage policies on behalf of customers (such as customer 604) of the computing resource service provider 602. The policy management service 620 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 602, in various embodiments, is also equipped with a task service 622. The task service 622 is configured to receive a task package from the customer 604 and enable executing tasks as dictated by the task package. The task service 622 may be configured to use any resource of the computing resource service provider 602, such as one or more instantiated virtual machines or virtual hosts, for executing the task. The task service 624 may configure the one or more instantiated virtual machines or virtual hosts to operate using a selected operating system and/or a selected execution application in accordance with a requirement of the customer 604.

The computing resource service provider 602 additionally maintains one or more other services 624 based at least in part on the needs of its customers 604. For instance, the computing resource service provider 602 may maintain a database service for its customers 604. A database service may be a collection of computing resources that collectively operate to run one or more databases for one or more customers 604. The customer 604 may operate and manage a database from the database service by utilizing appropriately configured API calls. This, in turn, may allow a customer 604 to maintain and potentially scale the operations in the database. Other services include, but are not limited to, object-level archival data storage services, services that manage and/or monitor other services.

The computing resource service provider 602 further includes an archival storage service 624. The archival storage service 624 may comprise a collection of computing resources that collectively operate to provide storage for data archiving and backup of customer data. The data may comprise one or more data files that may be combined to form an archive. The archival storage service 624 may be configured to persistently store data that may be infrequently accessed and for which long retrieval times are acceptable to a customer utilizing the archival storage service 624. A customer may interact with the archival storage service 624 (for example, through appropriately configured API calls made to the archival storage service 624) to generate one or more archives, upload and retrieve the one or more archives or monitor the generation, upload or retrieval of the one or more archives.

The computing resource service provider 602 additionally maintains one or more other services 626 based at least in part on the needs of its customers 604. For instance, the computing resource service provider 602 may maintain a database service for its customers 604. A database service may be a collection of computing resources that collectively operate to run one or more databases for one or more customers 604. The customer 604 may operate and manage a database from the database service by utilizing appropriately configured API calls. This, in turn, may allow a customer 604 to maintain and potentially scale the operations in the database. Other services include, but are not limited to, object-level archival data storage services, services that manage and/or monitor other services.

Figure 7:
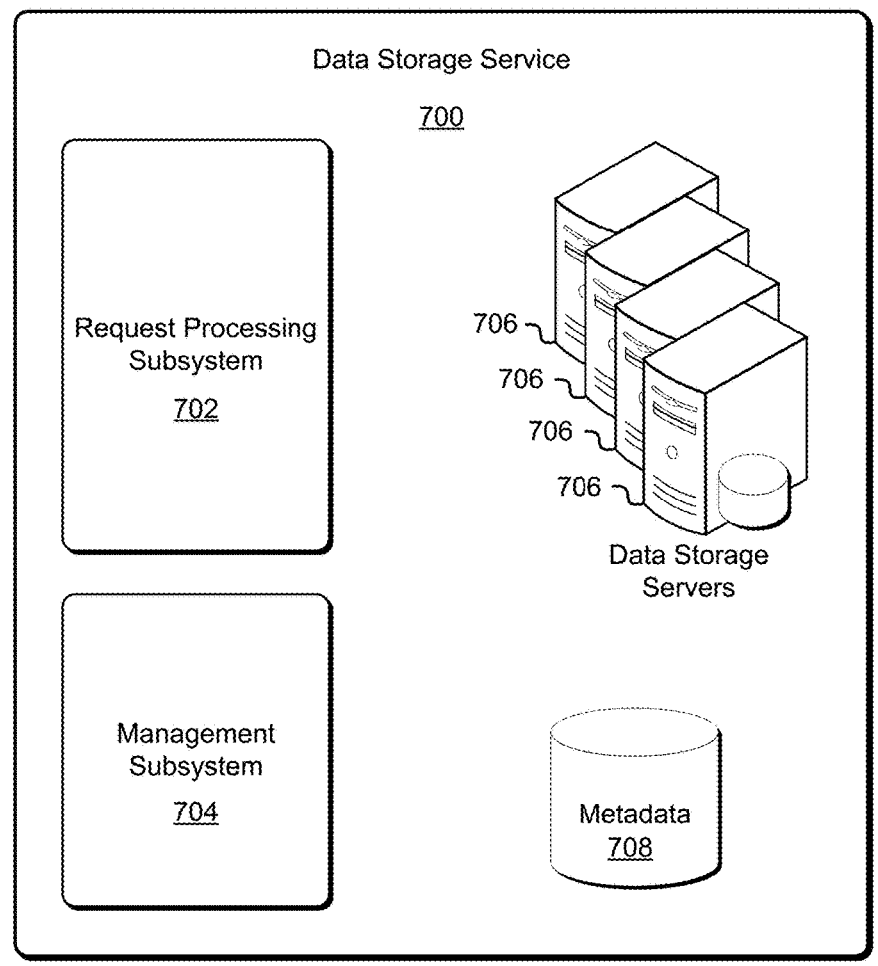
FIG. 7 schematically illustrates a data storage service capable of implementing various data storage and indexing techniques, in accordance with some embodiments.

FIG. 7 shows an illustrative example of a data storage service in accordance with various embodiments. The data storage service 700 may be a service of a computing resource provider used to operate an on-demand data storage service such as described above in connection with FIG. 6. As illustrated in FIG. 7, the data storage service 700 includes various subsystems such as a request processing subsystem 702 and a management subsystem 704. The data storage service 700 may also include a plurality of data storage servers 706 and a metadata storage 708, which may store metadata about various data objects stored among the data storage servers 706 as described. In an embodiment, the request processing subsystem 702 is a collection of computing resources, such as webservers and application servers, collectively configured to process requests submitted to the data storage service 700. The request processing subsystem 702, for example, may include one or more webservers that provide a web service interface to enable customers of the data storage service 700 to submit requests to be processed by the data storage service 700. The request processing subsystem 702 may include computers systems configured to make various determinations in connection with the processing of requests, such as whether policy allows fulfillment of a request, whether requests are authentic (e.g., electronically signed using a suitable cryptographic key) and otherwise.

Components of the request processing subsystem may interact with other components of the data storage service 700 (e.g., through network communications). For example, some requests submitted to the request processing subsystem 702 may involve the management of computing resources which may include data objects stored by the data storage servers 706. The request processing subsystem 702, for example, may receive and process requests to modify computing resources. For instance, in some examples, data objects are logically organized into logical data containers. Data objects associated with a logical data container may, for example, be said to be in the logical data container. Requests to the data processing subsystem 702 may include requests for creating logical data containers, deleting logical data containers, providing an inventory of a logical data container, providing or updating access control policy with respect to one or more logical data containers and the like.

The requests may be processed by the management subsystem 704 upon receipt by the request processing subsystem 702. If applicable, various requests processed by the request processing subsystem 702 and/or management subsystem 704, may result in the management subsystem 704 updating metadata associated with data objects and logical data containers stored in the metadata store 708. Other requests that may be processed by the request processing subsystem 702 include requests to perform operations in connection with data objects. The requests, for example, may include requests to upload data objects to the data storage service 700, to download data objects from the data storage service 700, to delete data objects stored by the data storage service 700 and/or other operations that may be performed.

Requests processed by the request processing subsystem 702 that involve operations on data objects (upload, download, delete, e.g.) may include interaction between the request processing subsystem 702 and one or more data storage servers 706. The data storage servers 706 may be computer system communicatively coupled with one or more storage devices for the persistent of data objects. For example, in order to process a request to upload a data object, the request processing subsystem may transmit data to a data storage server 706 for persistent storage. It is noted, however, that in some embodiments, client (e.g., customer) computer systems may transmit data directly to the data storage servers 706 instead of through severs in the request processing subsystem.

In some embodiments, the request processing subsystem 702 transmits data to multiple data storage servers 706 for the purposes of redundantly storing the data to allow the retrievability of data in the event of failure of an individual data storage server 706 and/or associated data storage device. For example, in some embodiments, the request processing subsystem uses a redundancy in coding scheme such as erasure coding to deconstruct a data object into multiple parts that are stored among the data storage servers 706. The parts may be configured such that if access to a certain number of parts is lost, the data object may nevertheless be reconstructible from the remaining parts that remain accessible.

To enable efficient transfer of data between the request processing subsystem 702 and the data storage servers 706 and/or generally to enable quick processing of requests, the request processing subsystem 702 may include one or more databases that enable the location of data among the data storage servers 706. For example, the request processing subsystem 702 may operate a key value store that serves to associate identifiers of data objects with locations among the data storage servers 706 for accessing data of the data objects.

Figure 8:
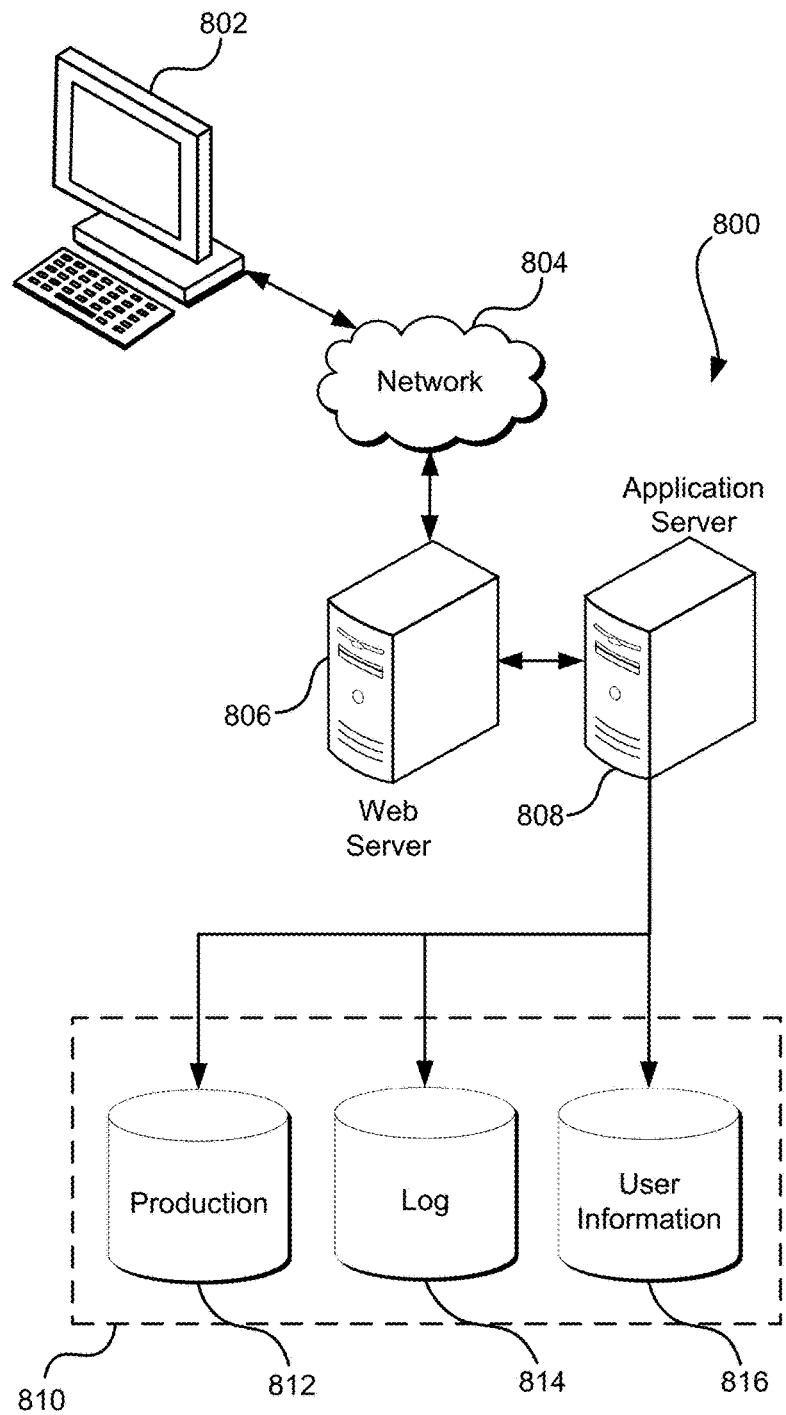
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    placing data storage requests in a queue;
    generating, based at least in part on the data storage requests, corresponding event records for the data storage requests;
    storing the event records in a cache;
    dequeueing a first subset of data storage requests from the queue to be processed by a backend data store;
    removing, based at least in part on the first subset of the data storage requests, a corresponding first subset of the event records from the cache;
    processing, asynchronously relative to processing by the backend data store of the first subset of data storage requests, storage event status requests by:
        determining that a first subset of the storage event status requests corresponds to the first subset of the data storage requests at the backend data store;
        returning, for the first subset of the storage event status requests, first status information for the first subset of the data storage requests;
        determining that a second subset of the storage event status requests corresponds to a second subset of the data storage requests outside of the first subset of the data storage requests;
        generating second status information based at least in part on a second subset of event records corresponding to the second subset of the data storage requests and outside of the first subset of the event records; and
        returning, for the second subset of the storage event status requests, the second status information.

2. The computer-implemented method of claim 1, wherein the first status information indicates whether data associated with the first subset of data storage requests was successfully stored on the backend data store.

3. The computer-implemented method of claim 1, wherein the event records indicate whether the data storage requests were placed in the queue.

4. The computer-implemented method of claim 1, further comprising:
    determining that none of the event records matches a third subset of the storage event status requests; and
    responding to the third subset of the storage event status requests with third status information that indicates that the third subset of the data storage requests was received.

5. A system, comprising:
    at least one computing device implementing one or more services that at least:
    queue data storage requests;
    place event records containing information corresponding to the data storage requests in a cache;
    remove, from the cache, a first subset of the event records in connection with processing of a corresponding first subset of the data storage requests; and
    respond, asynchronously relative to the processing of the first subset of the data storage requests, to storage event status requests for the data storage requests by:
        determining that a second subset of the data storage requests corresponding to the storage event status requests remains in the cache; and
        returning a second subset of the event records corresponding to the second subset of the data storage requests.

6. The system of claim 5, wherein the one or more services further:
    re-submit the second subset of the data storage requests to a backend data store for processing; and
    remove the second subset of the event records from the cache.

7. The system of claim 6, wherein the one or more services further determine that the second subset of the data storage requests remains in the cache by querying a backend data store for status information related to the second subset of the data storage requests.

8. The system of claim 5, wherein the one or more services further dequeue the data storage requests into a backend data store.

9. The system of claim 8, wherein the one or more services further adjust a rate at which the data storage requests are dequeued.

10. The system of claim 9, wherein the one or more services further adjust the rate at which the data storage requests are dequeued in accordance with a request rate that is determined by a scaler associated with the system.

11. The system of claim 8, wherein the one or more services further adjust a capacity of the backend data store based on a request rate that is determined by a scaler associated with the system.

12. The system of claim 8, wherein the one or more services further adjust a capacity of a queue that holds the queued data storage requests, in accordance with a request rate that is determined by a scaler associated with the system.

13. A non-transitory computer-readable storage medium having stored thereon executable instructions that, as a result of execution by one or more processors of a computer system, cause the computer system to at least:

determine a request rate for incoming data storage requests, the data storage requests being placed in a queue in connection with being received by the computer system;

cache the incoming data storage requests in a cache;

based on the determined request rate and a size of the cache, at least:

adjust a dequeuing rate at which the data storage requests are being dequeued from the queue and submitted to a backend data store;

adjust a capacity of the backend data store to accept the data storage requests that are submitted from the queue; and adjust a length of the queue to accommodate the determined request rate; and respond, asynchronously relative to the processing of the data storage requests by the backend data store, to storage event status requests for the data storage requests based at least in part on contents of the cache and processing status associated with the backend data store.

14. The non-transitory computer-readable storage medium of claim 13, wherein the instructions further comprise instructions that, as a result of being executed by the one or more processors, cause the computer system to remove the event records from the cache in response to a notification that the data storage requests have been dequeued from the queue.

15. The non-transitory computer-readable storage medium of claim 13, wherein the instructions further comprise instructions that, as a result of being executed by the one or more processors, cause the computer system to adjust the dequeuing rate by increasing the dequeuing rate if the determined request rate is below a predetermined value.

16. The non-transitory computer-readable storage medium of claim 13, wherein:

the backend data store includes a plurality of provisionable hosts, and the instructions further comprise instructions that, as a result of being executed by the one or more processors, cause the computer system to adjust a quantity of the provisionable hosts so as to accommodate the adjusted dequeuing rate.

17. The non-transitory computer-readable storage medium of claim 13, wherein the instructions further comprise instructions that, as a result of being executed by the one or more processors, cause the computer system to adjust the length of the queue prior to adjusting the capacity of the backend data store.

18. The non-transitory computer-readable storage medium of claim 13, wherein the instructions further comprise instructions that, as a result of being executed by the one or more processors, cause the computer system to adjust the length of the queue to correspond with a size of the cache.

19. The non-transitory computer-readable storage medium of claim 18, wherein the size of the cache is fixed by the computer system.

20. The non-transitory computer-readable storage medium of claim 13, wherein the instructions further comprise instructions that, as a result of being executed by the one or more processors, cause the computer system to maintain a nominal capacity of the backend data store that corresponds to an average request rate that is lower than the determined request rate.

* * * * *